Figure 1:
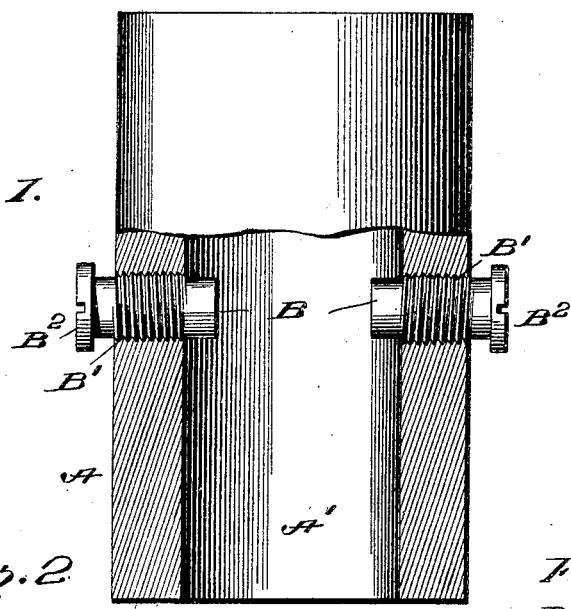

No. 807,437. PATENTED DEC. 19, 1905.
A. L. BURT.
PROCESS OF MAKING GAME BALLS.
APPLICATION FILED JUNE 2, 1902.

Inventor
Alonzo L. Burt
By Philip Mauro
Attorney

Witnesses

UNITED STATES PATENT OFFICE.

ALONZO L. BURT, OF MILBURN, NEW JERSEY, ASSIGNOR TO THE BURT COMPANY, OF MILBURN, NEW JERSEY, A CORPORATION OF NEW JERSEY.

PROCESS OF MAKING GAME-BALLS.

No. 807,437. Specification of Letters Patent. Patented Dec. 19, 1905.

Application filed June 2, 1902. Serial No. 109,859.

*To all whom it may concern:*

Be it known that I, ALONZO L. BURT, a resident of Milburn, Essex county, New Jersey, have invented a new and useful Improved Process of Making Game-Balls, which invention is fully set forth in the following specification.

This invention relates to the manufacture of game-balls, and is particularly useful in the manufacture of the striped balls used in the game of "pool."

The process constituting the present invention is described but not claimed in my application filed December 5, 1901, Serial No. 84,750.

Balls of the character above described are made of compositions of matter in a dry finely-divided condition, having the property of becoming integrated and homogeneous under the influence of heat and high pressure.

According to the process heretofore used and to which the present invention is most nearly allied the ball has been made as follows: The material to constitute the striped part of the ball properly colored was formed in the shape of a disk of proper thickness and whose diameter was approximately that of the finished ball. This portion, herein called the "center," was integrated by heat and pressure and the cavities or depressions to receive the "spots" or number-pieces were formed by drilling. The spherical shape was given to the ball by the application to each side of the disk of a piece convex exteriorly. The whole article was again subjected to heat and pressure to integrate these side pieces and to unite them to the center. The spots (previously integrated by heat and pressure) were introduced into their cavities and another application of heat and pressure was made. The rough surfaces of the spots were then turned off and the article subjected to a final heating and compression.

My present invention aims to simplify and cheapen this process and to produce a ball superior to that heretofore made, in that the different parts are more firmly united together and the article more uniform or homogeneous throughout. According to this invention the center (or the core, as the case may be) instead of being integrated is compressed into its approximately final form in a cold state. The side pieces are likewise applied and molded to the center in the cold. One application of heat therefore integrates these parts and results in greater uniformity in regard to density and other properties throughout. The process is also applicable to balls made by first forming a core and then placing a shell around it.

A further feature of the invention consists in applying the same principle to the spots. In shaping the center I form at the same time two cavities therein to receive the spots, and the latter (formed in the same manner by cold compression of the material) are inserted with a filling of loose material, and the whole article is then subjected to one application of heat and pressure. An important result of the invention is the production of a ball wherein the spot is united to the body with absolute solidity.

In the accompanying drawings I have illustrated apparatus which may be used in carrying out the invention.

Figure 2:
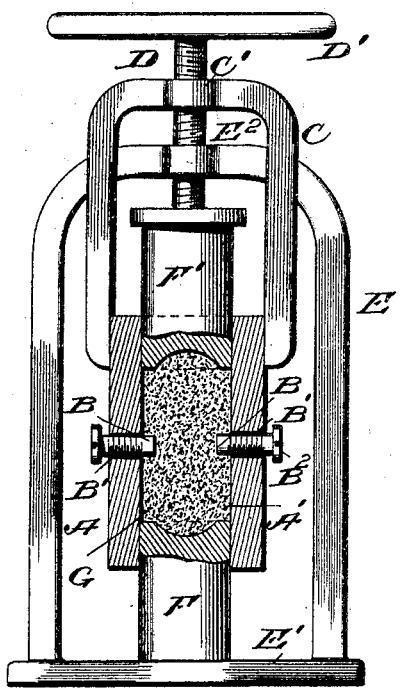
Figure 3:
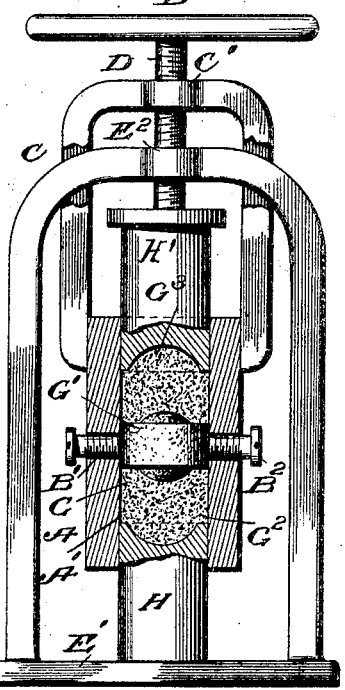
Figure 4:
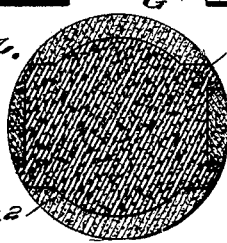

Figure 1 is an elevation, partly in section, of a mold. Fig. 2 is a side elevation of an apparatus in connection with which the mold may be used. Fig. 3 illustrates the same apparatus with dies of a different shape from those shown in Fig. 2, and Fig. 4 is a cross-section of a ball made in accordance with the invention.

The mold illustrated in the drawings consists of a cylindrical hollow body A, open at both ends and provided, preferably at its center, with transverse apertures located at diametrically opposite points and extending from the bore A' of the body to the outside thereof. These apertures, as shown, are screw-threaded and are adapted to receive plugs having smooth cylindrical ends B, adapted to project into the bore of the mold-body, screw-threaded portions B', and outer heads B², by means of which the plugs may be moved in or out. The plugs are thus movable so that they may be projected into the bore A' or withdrawn therefrom. This mold is adapted for use in conjunction with a press or set of dies of any suitable construction, such as shown in Figs. 2 and 3. As illustrated in said figures, the mold-body A is stationary and is connected with arms C, in which is formed a bearing C' for a screw-spindle D, provided with an operating-wheel D'. The screw-spindle D has two screw-threads of opposite pitch, and the thread which engages the bearing C' has only one-half the pitch of the other thread, which is shown below said bearing. The thread of greater pitch engages a bearing or nut E² upon a frame E, which is guided along the arms C, so that it can slide thereon but cannot turn. The frame E has a cross-bar E', on which the lower die is adapted to be supported while the spindle D presses against the upper die. It will be understood that by screwing the spindle D inward the upper die and the lower die will be forced toward each other, each having a movement of the same extent.

In carrying out the invention the apparatus is used as follows: The lower die F is first inserted alone and the cavity or bore A' of the mold is filled with loose material G. It will be understood that the die F is first in its lowermost position, with its top flush with the bottom of the mold. The dies F F', which I employ in the first stage of my process, have cup-shaped or spherically-curved recesses on their inner surfaces surrounded by annular plane surfaces. After the mold has been filled as described, the ends B of the plugs being within the mold, as shown in Fig. 2, the upper die F' is placed on top of the loose material and the hand-wheel D' is turned so as to force the dies evenly toward each other. The result will be a firmly-compressed center or core of plastic material, such as indicated by the letter G' in Fig. 3, which core consists of a cylindrical or disk-shaped portion with spherically-curved sides projecting therefrom at the ends. In the example illustrated in the drawings the center G' constitutes the striped portion of the finished article. This body is held in its central position by the ends B of the plugs, so that it will not drop when the dies F F' are moved outwardly. This operation being completed, the dies F F' are withdrawn and a lower die H of a different form is placed on the cross-bar E' in such a manner that the upper end of said die will be flush with the lower end of the mold. A suitable amount of loose material G² is introduced between the core G' and the lower die H, and a like quantity of loose material G³ is placed on top of the center G'. The dies H H' are cylindrical, with spherical recesses in their ends, said recesses being of much larger diameter than those of the dies F F' and extending almost to the outer edges of the dies. When the dies H H' are moved toward each other, the loose material G² G³ will in a cold state be pressed into a coherent body, which will be united with the center G' sufficiently to enable the ball roughly formed in this manner to be further handled in the usual way. After the dies H H' have been removed from the mold the compressed ball, consisting of the center G' and two spherically-curved end pieces, will be withdrawn from the mold by simply screwing the plugs outward until they release the center G' and then pushing the ball out of the mold endwise. These compressing processes are carried out while the material is in a cold state, and therefore without impairing the valuable property of the material to become firmly united or integrated by the application of heat. The end portions B of the plugs serve not only to hold the center G' in its central position, but principally to form recesses or cavities therein which will be adapted to receive the spots which are used in game-balls of this character. These spots I, Fig. 4, are formed in the usual manner by compression in the cold state from material of the same nature as the remainder of the ball and are then inserted in the recesses of the center G'. Thus the ball consists of five pieces— namely, the center G', the two end pieces G² G³, and the two spots I. Each of these pieces has been formed by compression in the cold state without the application of heat. Finally, the roughly-formed ball is compacted and baked by the application of heat and high pressure in the usual manner.

The foregoing description will enable those skilled in the art to practice the invention and to apply it to the production of the different varieties of balls used in the game of pool and in analogous games.

What I claim is—

1. The process of making composition game-balls which process consists in shaping by cold compression of the loose material the separate parts whereof the ball is composed, and integrating the entire article by the application of heat and high pressure.

2. The process of making composition balls by compressing the loose material in a cold state to form a core or center, completing the spherical outline by compressing loose material upon the core or center in a cold state, and integrating the entire article by heat and pressure.

3. The process of making composition balls by compressing loose material in a cold state to the approximate form desired and simultaneously forming cavities therein, compressing similar material in a cold state to form the spots, inserting the spots in the cavities and integrating the article by heat and pressure.

4. The process of making composition balls by compressing loose material in a cold state to form the center and simultaneously forming cavities therein, compressing similar material upon the center to complete the spherical outline, forming spots by cold compression of said material, introducing the spots in the cavities, and integrating the article by heat and pressure.

5. Molding the central or middle portion out of colored stock, cold, and simultaneously coring out the cavities therein, adapted to receive the number-inserts; and then molding onto the opposite faces of the said central portion, the two parts composed of white stock; these molded-together parts being adapted to be, subsequently, heated and solidified, with the usual inserts applied to the middle ball portion.

6. Molding the middle, colored portion of the ball and simultaneously forming therein the insert-cavities; then applying thereto the inserts; next molding onto the opposite surfaces of said middle portion the two segmental white portions to complete the ball-blank; and then subjecting the concrete mass to the usual heat and pressure to solidify and harden it, for the usual final turning down and polishing of the ball, as set forth.

In testimony whereof I have signed this specification in the presence of two subscribing witnesses.

ALONZO L. BURT.

Witnesses:
  H. PALMER,
  W. H. HOYT.